United States Patent [19]

Walker

[11] 3,989,630

[45] Nov. 2, 1976

[54] LOW SOLIDS SHALE CONTROLLING DRILLING FLUID

[75] Inventor: Clarence O. Walker, Richmond, Tex.

[73] Assignee: Texaco Inc., New York, N.Y.

[22] Filed: Dec. 9, 1974

[21] Appl. No.: 530,911

Related U.S. Application Data

[63] Continuation-in-part of Ser. No. 309,327, Nov. 24, 1972, abandoned.

[52] U.S. Cl. .............................. 252/8.5 A; 175/65; 252/8.5 B
[51] Int. Cl.² ....................... C09K 7/02; C09K 7/04
[58] Field of Search ...................... 252/8.5 A, 8.5 B; 175/65

[56] References Cited
UNITED STATES PATENTS

| | | | |
|---|---|---|---|
| 2,044,758 | 6/1936 | Cross et al. ....................... | 252/8.5 X |
| 2,732,343 | 1/1956 | Rowe ................................... | 252/8.5 |
| 2,802,783 | 8/1957 | Weiss et al. ......................... | 252/8.5 |
| 2,896,915 | 7/1959 | Weiss et al. ......................... | 252/8.5 X |
| 3,185,642 | 5/1965 | Sawyer et al. ...................... | 252/8.5 |
| 3,852,201 | 12/1974 | Jackson .............................. | 252/8.5 |

*Primary Examiner*—Herbert B. Guynn
*Attorney, Agent, or Firm*—T. H. Whaley; C. G. Ries; Jack H. Park

[57] ABSTRACT

An aqueous low solids drilling fluid especially suitable for drilling sloughing, mud yielding shale formations. The drilling fluid has an A.P.I. filtration rate in excess of 100 milliliters, a soluble calcium level in excess of 200 and preferably in excess of 1000 parts per million, a filtrate alkalinity greater than 0.1 milliliters of .02 N sulfuric acid per milliliter of filtrate, at least one pound per barrel excess or undissolved calcium hydroxide, a salinity of at least 50,000 parts per million and a ratio of plastic viscosity to yield point not greater than one.

16 Claims, No Drawings

LOW SOLIDS SHALE CONTROLLING DRILLING FLUID

CROSS REFERENCE TO RELATED APPLICATIONS

This is a continuation-in-part of copending application Ser. No. 309,327, filed Nov. 24, 1972, now abandoned.

BACKGROUND OF THE INVENTION

1. Field of the Invention

This invention relates to a novel aqueous drilling fluid and a method for drilling wells through subsurface formations by means of rotary drilling tools utilizing said fluid, and particularly to an aqueous drilling fluid having low solids content and high filtration rate for improved drilling rate and having shale controlling characteristics.

2. Description of the Prior Art

Drilling fluids, or drilling muds as they are sometimes called, are slurries of clayey solids used in the drilling of wells in the earth, such as are drilled for the purpose of tapping subterranean deposits of petroleum, gas and other fluid materials. Such fluids have a number of different functions, the most important of which involve removing cuttings from the well, sealing off permeable formations of gas, oil, or water which may be encountered at various levels as the well is drilled into the subterranean formations, lubricating the drilling tool and drill pipe which carries the tool, and holding the cuttings in suspension in the event of shutdown in drilling and pumping of the drilling fluid.

An ideal drilling fluid is a thixotropic fluid, i.e., a fluid whose apparent viscosity decreases as the degree of agitation or shear rate increases (such as is caused by pumping or otherwise circulating the fluid through the drill string); but when such agitation or shearing or circulation is halted, the fluid gels or forms a gel structure which will support the drilled cuttings to prevent them from falling back down into the bottom of the hole. The rate of gel formation must be such as to permit the cuttings to fall only a short distance before the gel structure is sufficiently strong to support them. It is important to maintain the degree of gellation and the rate of gellation within narrow limits, since excessive gel formation will be detrimental to resumption of the drilling operation, and insufficient gel formation will permit the formation cuttings to fall to the bottom of the hole, which can result in sticking of the drill pipe.

In modern rotary drilling technology, conventional practice involves the pumping of a drilling fluid having the proper viscosity, gel rate and gel strength down the center conducting passage of the drill string, through the jets in the drill bit attached to the bottom of the drill string, where the fluid jets downward and agitates the formation being drilled by the drill bit. The jetting action assists in the drilling operation, accumulates formation cuttings, and assists in transporting these cuttings away from the immediate area being drilled by the drill bit and up to the surface. The drilling fluid passes upward via the annular space between the exterior of the drill string and the wall of the hole being drilled. The drilling fluid must have sufficient viscosity so that during the time it is being pumped and otherwise agitated, it will support and transport the sand and formation cuttings in the return trip to the surface of the earth. In the event drilling operations and drilling fluid pumping are suspended, the gel rate and gel strength must be adequate to support the drilled solids and other particulate matter in the annular space, to prevent their falling to the bottom of the hole.

When the well is being drilled through highly permeable formations, materials are added to the drilling fluid to increase the tendency to form a low permeability mud cake on the borehole wall against the porous formation, as the liquid filtrate phase filters into the porous formation. In very permeable formations, it is desirable to have adequate colloidal material present in the drilling fluid to form a thin impermeable cake as quickly as possible. Rapid formation of the proper filter cake is necessary to reduce the filtration rate quickly as the cake forms, and also to avoid the development of an excessively thick cake which can increase the friction between the rotating drill string and the wellbore, and which can also reduce the annular flow passage by which the drilling fluid returns to the surface of the earth.

In some areas of the country, formations known as heaving or sloughing shales are penetrated as the well is drilled into the subterranean formations. As the well is drilled into these heaving shale formations when conventional aqueous or water-base drilling fluids are being employed in the drilling operation, considerable difficulty can be encountered. Certain shales, such as are encountered in the Gulf Coast area of Texas and Louisiana, contain considerable concentrations of mud making clays or minerals such as sodium montmorillonite which tend to swell upon hydration or absorption of water from the drilling fluid, and bring about an immediate increase in the viscosity and gel of the drilling fluid used. This addition of hydrated clay solids to the drilling fluids must be counteracted by watering or a chemical drilling fluid system must be employed to stabilize these heaving shale materials. In the case of heaving shale formations containing water hydratable clayey solids, drilling fluid systems have been developed which adequately stabilize the shale sections as they are being drilled. For example, U.S. Pat. No. 2,802,783 (1957), Weiss, et al. and U.S. Pat. No. 2,896,915 (1959) Weiss et al, describe chemicalized systems which have been extremely useful in drilling the type of mud making heaving shales encountered in the Gulf Coast region.

Another type of troublesome heaving or sloughing shale having similar external appearances but significant chemical differences from the above described Gulf Coast heaving shale sections, has been encountered in drilling in the Delaware Basin area of West Texas and New Mexico. This shale section, referred to as the Wolfcamp-Pennsylvanian-Mississippian interval of the Delaware Basin, is a predominately shale interval which, unlike the Gulf Coast shale sections, contains essentially no bentonite clay. The Wolfcamp shale is predominantly illitic in composition. It is believed that the heaving occurs because the shale has small fissures or cracks in it, which permit invasion by the drilling fluid or filtrate of the drilling fluid to cause hydration of the hydratable materials present in the shale, resulting in an unstable condition.

Historically, the Wolfcamp shale interval has been drilled by resorting to an aqueous drilling fluid which has been treated with colloidal materials to produce a very low filtration rate, in the range of 15 to 20 cc's when measured by the standard A.P.I. testing procedure. Although the Wolfcamp shale interval is essentially impermeable, the presence of colloidal filtration control additives decreases the extent of entrance of the drilling fluid or filtrate thereof into the small fissures in the shale, and thereby decreases the sloughing tendency to some extent. Also, the drilling fluid density, or mud weight as it is referred to in drilling fluid technology, is maintained at a greater level than is necessary to produce a hydrostatic pressure sufficient to offset the pore pressure of the formation being drilled. Drilling fluid densities, or drilling mud weights, of 11 to 14 pounds per gallon have been employed in drilling this interval, which is in excess of the drilling fluid density necessary to produce a hydrostatic pressure in excess of the gas pressures encountered in this interval.

Materials used to achieve this filtration rate reduction are generally colloidal materials such as starch, carboxymethycellulose, or water yielding clays such as bentonite. These materials, together with the natural clays dispersed in the highly dispersive aqueous drilling fluid commonly employed in this area, result in a relatively high solids content, e.g., in the range of from 12 to 18 percent total solids for mud weights of only around 10½ pounds per gallon.

Unfortunately, while the above described operating procedures have been moderately effective in controlling the sloughing tendency of the Wolfcamp shale interval, all of these corrective measures increase the cost of the drilling fluid being employed in drilling the well. Even more significantly, all of the factors described above, including reduced filtration rate, increased mud weight, and increased total solids content, cause a significant decrease in the drilling or penetration rate. Since the drilling rigs employed in the drilling of such wells are quite expensive, the increased time required to drill a well to a predetermined depth can have a more significant impact on the total cost of the well than the direct expenditures for drilling fluid chemicals. This will be shown more precisely in specific field examples contained later in this specification.

Some recognition of this specific problem is shown in the publication in the *Oil and Gas Journal* for May 29, 1972, "New mud holds shales, allows fast drilling in West Texas", by Mr. John L. Kennedy. The cited publication relates the experience of a West Texas operator in drilling wells in the Delaware Basin using a salt brine fluid containing a polysaccharide hydrophilic polymer which appears to stabilize the Wolfcamp shale interval to some extent.

It is a goal of the preferred embodiments of this invention to provide an improved drilling fluid which achieves significant stabilization of non-mud making shale formations such as the Wolfcamp formation, while still providing optimum properties for low cost, rapid drilling rate, and trouble-free operation.

SUMMARY OF THE INVENTION

A drilling fluid in accordance with this invention would contain sea water or a brine having at least 50,000 parts per million sodium chloride and which may be a saturated brine, to which is added from about 1 to about 10 pounds per barrel calcium hydroxide, from about ¼ to about 1 pound per barrel of a calcium salt having a solubility greater than calcium hydroxide such as calcium chloride, sufficient to yield a soluble calcium level in excess of 200 and preferably in excess of 800 parts per million. The filtrate alkalinity (the number or milliliters of 0.02 N $H_2SO_4$ required to titrate 1 milliliter of drilling fluid filtrate to the phenolphthalein end point) is greater than 0.1 and preferably greater than 0.5. The $P_m$ (whole mud alkalinity, defined as the number of milliliters of 0.02 N sulfuric acid required to titrate 1 milliliter of whole mud to a phenolphthlein end point) should be maintained between 10 to 30. The $P_m$ is principally determined by the amount of excess of undissolved calcium hydroxide (lime) contained in the slurry. One pound of calcium hydroxide per barrel of drilling fluid will produce approximately 3 milliliters of mud alkalinity.

Sufficient attapulgite clay or asbestos will be added to the fluid to produce a plastic viscosity in the range from about 6 to 12 centipoise, and a yield point in the range of from 10 to 30. The ratio of plastic viscosity to yield point should be maintained typically between 0.5 and 1.0. No water-yielding clay such as bentonite (commonly referred to as gel) will be added to the drilling fluid, since it is ineffective in this chemical environment. No filtration control material will ordinarily be added, and the filtration rate of an untreated fluid will typically run from 100 to 200 milliliters when measured by the A.P.I. standard test procedure.

DESCRIPTION OF THE PREFERRED EMBODIMENTS

In the drilling of oil and gas wells in the geographical area in which the Wolfcamp type shales are encountered, such as in the Delaware Basin, it is common practice to employ brine as the drilling fluid for the drilling of the first few thousand feet of hole, or to the point where it is expected that the troublesome heaving shale interval will be encountered. It is preferred to use this top hole drilling fluid as the base from which the low solids shale control drilling fluid of the present invention is prepared. Of course the low solid shale control drilling fluid of this invention may be prepared by adding the desired chemicals to bay water, sea water or freshly prepared brine. It is not essential that the base fluid from which the novel low solid shale control drilling fluid is prepared be saturated with respect to sodium chloride, although it is an especially attractive feature that the subject drilling fluid may be prepared either from sea water, brine or from saturated brine. Moreover, there are practical advantages in the use of brine, since it is generally readily available in the oil field, and also because it is frequently used to drill the top hole section of the well. The desired shale stabilization requires a minimum of 50,000 parts per million sodium chloride, and preferably greater than 50,000 parts per million sodium chloride.

The low solid shale control drilling fluid of this invention is prepared by adding from about 1 to about 10 pounds of calcium hydroxide per barrel of brine, and preferably from around 3 to around 6 pounds of calcium hydroxide per barrel of brine. Since this represents an addition of considerably more calcium hydroxide than can be dissolved in brine at ambient surface temperatures, there will be appreciable undissolved calcium hydroxide in the fluid. Indeed it is a desirable feature of this fluid that there be some undissolved calcium hydroxide present in the slurry, since undissolved calcium hydroxide acts as a source of calcium and alkalinity to maintain the required levels thereof to obtain effective shale stabilization. Shale stabilization using this system is a chemical reaction between the liquid phase of the drilling fluid and the shale which consumes calcium and alkalinity from the drilling fluid, which must be replaced by dissolution of previously undissolved calcium hydroxide if the shale controlling chemistry is to be maintained.

After the brine containing the calcium hydroxide has been mixed for a length of time sufficient to establish maximum dissolution of calcium hydroxide in the brine, the calcium level of the filtrate or aqueous phase should be determined. This is a standard procedure in oil well drilling fluid technology, and involves the filtration of a small quantity of drilling fluid to obtain the separate filtrate or aqueous phase thereof, which is titrate with ethylenediamine to obtain the calcium content. In order for the drilling fluid to exhibit shale stabilization, the soluble calcium level of the aqueous phase must be above at least 200 parts per million, and preferably in excess of about 800 to 1000 parts per million. If the soluble calcium level measured after the addition of from 1 to 10 pounds of calcium hydroxide per barrel of fluid is below 800 parts per million, from around 0.25 to about 1.0 pound of a water soluble calcium salt having a solubility greater than calcium hydroxide, such as calcium chloride, should be added per barrel of drilling fluid. Any other calcium salt having a solubility in water greater than calcium hydroxide will function satisfactorily in this invention. Calcium sulfate, calcium nitrate, calcium acetate and calcium formate may be used to increase the soluble calcium concentration of the filtrate or aqueous phase as well as calcium chloride.

The P mud (whole mud alkalinity) is defined as the number of milliliters of 0.02 N sulfuric acid required to titrate 1 milliliter of whole drilling fluid to the phenolphthalein end point. This is a measure of the total mud alkalinity, including the alkalinity of the aqueous phase plus the undissolved calcium hydroxide present in the slurry. For optimum performance of the subject drilling fluid, the P mud or mud alkalinity should be maintained between 5 and 20 and preferably between 10 and 15 milliliters of 0.02 N sulfuric acid. Maintenance is accomplished by adding additional calcium hydroxide, and generally the addition of approximately 1 pound of lime per barrel of drilling fluid will increase the P mud or mud alkalinity by approximately 3 milliliters.

The filtrate alkalinity of $P_f$ is determined by obtaining a sample of filtrate from the whole drilling fluid, and titrating this drilling fluid filtrate or aqueous phase with 0.02 N sulfuric acid. $P_f$ is defined as the number of milliliters of 0.02 N sulfuric acid required to titrate 1 milliliter of drilling fluid filtrate to a phenolphthalein end point. The $P_f$ should be maintained above 0.1 and preferably at or above about 0.5 milliliters, and if the $P_f$ is below this figure, sufficient caustic or sodium hydroxide should be added to increase the $P_f$ to a value about 0.5. Caustic should be added cautiously since the use of excessive quantities of sodium hydroxide upsets the soluble calcium levels necessary to obtain adequate shale stabilization by the drilling fluid. It is generally recommended that no more than 0.25 pound of caustic per barrel of drilling fluid be added in any one circulation of the drilling fluid.

After the above chemical tests have been completed, and the necessary adjustments have been made to bring the essential chemical parameters within the prescribed limits, rheological properties of the fluid should be determined. It is standard practice in oil well drilling fluid technology to measure rheological properties of drilling fluids by the use of a Fann VG meter. The Fann VG meter provides a convenient method of determining two important parameters of mud rheology, namely the plastic viscosity and the yield point. The meter provides a deflection reading on a nonrotating cylinder concentric to another cylinder which can be made to rotate at various speeds. The annular space between the fixed and rotating members is filled with the drilling fluid being tested. Readings are taken at 300 and 600 rpm and the plastic viscosity is determined by subtracting the 300 rpm deflection reading from the 600 rpm reading. Plastic viscosity represents a measurement indicative of the solids content of the fluid. In the low solid shale control drilling fluid of the present invention, the plastic viscoisty should be in the range of from about 5 to about 20 centipoise and preferably from about 6 to about 12 centipoise. Since conventional montmorillonite clays such as bentonite will not hydrate and yield in the chemicalized system of this invention, it is necessary to build the yield point and plastic viscosity properties by adding an attapulgite clay, which is available commercially under the trade name of Salt Gel or Zeogel. The desired rheological properties can generally be obtained by adding from about 1 to about 10 pounds of attapulgite clay per barrel of drilling fluid. Asbestos fibers may also be used to build drilling fluid rheology.

The yield point is determined by subtracting the plastic viscosity described above from the 300 rpm reading on the Fann VG meter. The yield point is indicative of the state of dispersion or flocculation of the system, and will generally be in the range of from 5 to 40 and preferably from about 15 to about 30. If the yield point is below the desired range, additional attapulgite should be added. If the yield point is in excess of the indicated maximum value, sufficient water or brine may be added to the slurry to bring the yield point back into the desired range.

I have found that the best combination of desirable penetration rate properties and hole cleaning properties is obtained if the ratio of yield point to plastic viscosity is in a range from about 0.25 to about 1.0. This appears to give excellent hole cleaning properties, drilled solids suspension, and aids in physical stabilization of the wellbore. A ratio of yield point to plastic viscosity less than unity is a very unconventional characteristic of this drilling mud, since typical chemicalized drilling fluids in use today have a ratio considerably greater than one.

Another standard test in oil well drilling fluid technology involves determination of filtration rate. An American Petroleum Institute prescribed standard test cell and test procedure is commonly used in the industry. The filtration rate is expressed in the number of milliliters of filtrate which is obtained from a drilling fluid sample in a prescribed time with application of 100 pounds per square inch gas pressure to the drilling fluid. A chemicalized drilling fluid containing bentonite clays and a conventional dispersant such as a calcium lignosulfonate or ferrochrome lignosulfonate may have a filtration rate or A.P.I. water loss in the range of 20 to 40 milliliters, and it is common practice in the oil industry to add colloidal materials such as prehydrolized starch or carboxy-methycellulose to the drilling fluid for the purpose of reducing this filtration rate even further. It is not unusual to find filtration rates of from 1 to 10 milliliters in drilling fluids being employed in the drilling oil and gas wells in the United States. The novel low solid shale control drilling fluid of my invention represents a significant departure from this type of drilling fluid control. The filtration rate for the fluid described above will ordinarily be from around 100 to around 200 milliliters or more, and no colloidal material is added to this drilling fluid for the purpose of reducing its filtration rate. There are several advantages to be obtained in the use of a drilling fluid having such an abnormally high filtration rate. It is well known in the art of oil well drilling that a high filtration rate drilling fluid will increase the penetration rate, or the rate which the drill can penetrate the formation under optimum conditions of rotary speed and weight on bit. The exact reason for this phenomena is not clearly understood, although it is believed that as the bit drills into the formation, it is continually creating fractures and chips below the bit. Drilling fluids treated to have a very low filtration rate will tend to form filter cakes on these fractures as they are created, which reduce the rate of equalization of pressure between the drilling fluid and the pore pressure in the formation being drilled. By maintaining a high filtration rate, the pressure equalize quickly and the chips move more rapidly into the drilling fluid to be transported back to the surface, which permits the drill bit to contact undrilled formations more quickly.

The materials which reduce filtration rate of drilling fluids are conventionally employed in the drilling of wells through heaving shale formations such as the Wolfcamp formation because it is believed that the filtration control additive forms a filter cake to seal off the fissures and small cracks within the shale formation, thus preventing the sections of shale from sloughing into the drilling fluid. Since the subject novel low solid shale control drilling fluid effects a chemical stabilization of the shale surface by the fluid chemistry, it is not desirable for the material to be kept out of these cracks. By permitting ready access of fluid into the fissures and cracks in the shale, in depth penetration and stabilization of these incompetent formations is achieved.

No thinner or dispersant of any kind is normally employed in the low solid shale control drilling fluid of this invention. The rheological properties are ordinarily maintained within the limits described above by the use of water and attapulgite clay as necessary. This drilling fluid is a completely floculated system. If a conventional drilling fluid dispersant such as a calcium lignosulfonate is added to this drilling fluid, the yield point and plastic viscosity are decreased somewhat, but the filtration rate does not decrease. Moreover, if conventional water loss additives such as prehydrolized starch or carboxy-methylcellulose are added to the low solid shale control mud, little or no reduction in filtration rate will result. This is especially true if the low solid shale control mud is prepared in a saturated brine. This is a rather surprising result, since starch and carboxy-methylcellulose reduce the filtration rate in a drilling fluid which is saturated with sodium chloride or which has the calcium level of this drilling fluid; only when drilling fluid is saturated with sodium chloride and has the high calcium level of a shale control drilling fluid are materials ineffective for reducing the filtration rate. I have found, however, that hydroxyethylcellulose will effectively reduce the filtration rate of the low solid shale control drilling fluid. The use of such material is required only when this fluid is used to drill through a porous sand or sandstone formation, whose porosity is so high that a drilling fluid having a filtration rate of from around 100 to 200 milliliters would produce an objectionably thick filter cake on the wellbore. From about 1 to about 4 pounds of hydroxyethylcellulose per barrel of drilling fluid is sufficient to reduce the filtration rate to about 10 milliliters.

I have also found that finely granulated asbestos may be utilized to develop the desired rheological properties, and a mixture of asbestos and attapulgite clay, alone or including hydroxyethylcellulose if needed, also produce the desired plastic viscosity and yield point values.

LABORATORY EXPERIMENTS

In order to establish the operability of the subject invention, and further to determine the optimum ratios and concentrations of the various materials employed to formulate the system described in this specification, a number of laboratory tests were performed. The results of the preliminary tests, the data of which is contained in Table I below, indicated that the desired filtrate calcium and filtrate alkalinity could be obtained quite readily in brine using 5 pounds of calcium hydroxide per barrel of drilling fluid, and in some instances supplementing this treatment with calcium chloride. Sample numbers 1, 2 and 7, using 5 pounds of lime per barrel of fluid produced a filtrate calcium level in the range from around 475 to around 800 parts per million. It can be seen that the desired rheological properties are not readily obtained, however.

The desired low solids, floculated condition is identified by a ratio of plastic viscosity to yield point being less than 1. It can be seen that runs 1, 2, and 3 do not meet this criteria. A plastic viscosity to yield point ratio greater than 1 indicates a dispersed slurry. The desired rheology is obtained by adding 5 pounds of attapulgite per barrel of fluid and 5 pounds of asbestos per barrel of fluid, as shown in sample numbers 4 and 5, or 15 pounds of attapulgite per barrel of fluid as is illustrated in sample number 7. Montmorillonite clays such as bentonite will not yield in the highly chemicalized environment of the subject drilling fluid, and furthermore, the particle size distribution of montmorillonite is such as to make their use undesirable. This is illustrated by runs 1 and 6, wherein the plastic viscosity to yield point ratio of low solids shale control fluids containing bentonite is excessive.

TABLE I

| Sample Number | Composition Pounds of Additive Per Barrel of Fluid | Base Fluid | Weighted or Unweighted | PV[1] | YP[2] | PV/YP[3] | $P_f$[4] | Ca[5] ppm |
| --- | --- | --- | --- | --- | --- | --- | --- | --- |
| 1 | 5 - bentonite<br>5 - asbestos<br>5 - lime | Fresh Water | Weighted<br>14 Pounds<br>Per Gallon | 26 | 18 | 1.42 | 1.8 | 476 |
| 2 | 5 asbestos<br>5 lime | 9.2 Pound Per Gallon Brine | Weighted to 14 pounds Per Gallon | 23.5 | 4 | 5.87 | 2.0 | 856 |
| 3 | 15 - attapulgite<br>5 - lime | Fresh Water | Unweighted | 4.5 | 10.5 | 4.28 | 1.4 | 1200 |

TABLE I-continued

| Sample Number | Composition Pounds of Additive Per Barrel of Fluid | Base Fluid | Weighted or Unweighted | PV[1] | YP[2] | PV/YP[3] | $P_f$[4] | Ca[5] ppm |
|---|---|---|---|---|---|---|---|---|
| 4 | 1 - calcium chloride<br>5 attapulgite<br>5 asbestos<br>5 lime | Fresh Water | Unweighted | 14.5 | 19.5 | .74 | 1.4 | 1176 |
| 5 | 1 calcium chloride<br>5 attapulgite<br>5 asbestos<br>5 lime | 9.2 Pound Per Gallon Brine | Unweighted | 9.5 | 16.5 | .57 | 1.8 | 1480 |
| 6 | 1 calcium chloride<br>5 - bentonite<br>5 - asbestos<br>5 - lime | Fresh Water | Unweighted | 6.0 | 6.5 | .92 | 1.5 | 1184 |
| 7 | 1 - $CaCl_2$<br>15 attapulgite<br>5 lime | Fresh Water | Unweighted | 7.0 | 20.0 | .35 | 1.2 | 500 |

[1]PV = plastic viscosity, calculated from Fann VG Meter readings by subtracting the 300 reading from the 600 rpm reading.
[2]YP = yield point, calculated from Fann VG meter readings by subtracting the plastic viscosity from the 300 rpm reading.
[3]PV/YP = the ratio of plastic viscosity to the yield point, which is obtained by dividing the second column by the first column. A value greater than one indicates a dispersed and/or high solids state whereas a value less than 1 indicates a low solids floculated condition.
[4]$P_f$ = filtrate alkalinity, defined as the number of milliliters of .02 N sulfuric acid required to titrate one milliliter of the drilling fluid filtrate to a phenolphthalein end point.
[5]Ca ppm = concentration of calcium ion in the drilling fluid filtrate in parts per million.

TABLE II

| Sample Number | Composition Pounds of Additive Per Barrel of Fluid | PV[1] | YP[2] | PV[3]/YP | $P_f$[4] | Ca[5] ppm |
|---|---|---|---|---|---|---|
| 8 | 15 sodium bentonite<br>0.25 sodium carbonate<br>.025 polysaccharide in fresh water | 14.5 | 21.0 | .69 | 0 | 0 |
| 9 | 15 — attapulgite<br>5 — calcium hydroxide in fresh water | 7.0 | 20.0 | .35 | 1.2 | 500 |
| 10 | 15 attapulgite<br>5 calcium hydroxide<br>1 calcium chloride in fresh water | 4.5 | 10.5 | .43 | 1.4 | 1200 |
| 11 | 5 attapulgite<br>5 asbestos<br>5 calcium hydroxide in fresh water | 14.5 | 19.5 | .74 | 1.4 | 1176 |
| 12 | 5 sodium bentonite<br>5 asbestos<br>5 lime<br>1 calcium chloride in fresh water | 6.0 | 6.5 | .92 | 1.5 | 1184 |
| 13 | 5 — attapulgite<br>5 — asbestos<br>5 — calcium hydroxide<br>1 — calcium chloride in a 9.2 pound per gallon brine | 9.5 | 16.5 | .58 | 1.8 | 1480 |

[1-5]See Table I footnotes [cols. 9–10].

Another series of laboratory experiments were performed to develop operating parameters for use in the field trial to be described later in this specification and the data are given in Table II. Sample number 8 was comprised of a sodium bentonite clay, sodium carbonate and a polysaccharide hydrophilic polymer added to fresh water. Sample number 8 is not an example of the formulation representative of the subject invention, but rather is a comparative fluid typical of the polymer beneficiated bentonite fluids used commercially in the Delaware Basin for control of the Wolfcamp shale interval. This is a low solids system but it is not a floculated system, and does not have the filtrate calcium and alkalinity values which characterize the low solid shale control drilling fluid of my invention. Run 9 is comprised of a fresh water slurry containing attapulgite lime and calcium hydroxide, and as can be seen this is a low solids floculated system having the required shale controlling filtrate alkalinity and calcium content. Run number 10 is essentially identical to sample 9 except for the addition of 1 pound per barrel of calcium chloride. The principal effect of the use of additional calcium chloride is the increased filtrate calcium level, which will enhance the shale stabilization characteristics of the drilling fluid. Run 11 is comprised of 5 pounds of attapulgite clay per barrel of fluid, 5 pounds of asbestos per barrel of fluid, and 5 pounds of calcium hydroxide per barrel of fluid, said fluid being formulated in fresh water. As can be seen the use of 5 pounds of asbestos per barrel of drilling fluid produces a significant increase of the plastic viscosity and yet the plastic viscosity to yield point ratio is not increased. Sample number 12 is comprised of 5 pounds of sodium bentonite per barrel of fluid, 5 pounds of asbestos per barrel of fluid, 5 pounds of calcium hydroxide per barrel of fluid, and 1 pound of calcium chloride per barrel of fluid, using fresh water to formulate the drilling fluid. Sample 12 differs from sample 11 only in that a bentonite clay is used instead of an attapulgite clay. The filtrate chemistry is essentially the same for both samples, but the fluid rheologies are different. Since bentonite will not yield in this chemical environment, the plastic viscosity is considerably lower, and the ratio of plastic viscoisty to yield point is higher. Run number 13 differs from the preceding 5 samples of Table II in that it was formulated in a 9.2 pound per gallon brine, being essentially saturated with respect to sodium chloride. The drilling fluid was comprised of 5 pounds of attapulgite clay, 5 pounds of asbestos, 5 pounds of calcium hydroxide, and 1 pound of calcium chloride per barrel of fluid. The resultant fluid had an excellent plastic viscosity to yield ratio and very satisfactory filtrate chemistry.

The above-described laboratory experimental runs established the operability of the basic system utilizing attapulgite clay or a mixture of attapulgite clay and asbestos to obtain the desired rheological properties of the fluid, and utilizing calcium hydroxide and calcium chloride to obtain the desired shale controlling filtrate chemistry of the fluid. It was also concluded that the low solid shale control drilling fluid of my invention could be formulated using fresh water or brine with equally good fluid rheologies.

Another series of experiments was conducted to determine whether the filtration rate of the low solids shale control drilling fluid of my invention could be reduced using conventional drilling fluid water loss additives. The results, contained in Table III below, indicate that prehydrolized starch, carboxymethylcellulose and a chrome lignite product have little effect on filtration rate. Hydroxyethylcellulose adequately reduces the filtration rate. It was found that treatment of the low solids shale control drilling fluid with a commercial dispersant and caustic was necessary for control of drilling fluid rheology.

Another series of tests were performed to determine whether the concentration of sodium chloride in the low solids shale control drilling fluid of my invention affected the shale stabilizing of the fluid properties. A supply of gumbo core fragments was obtained and used in the following tests. In each run, 15 grams of gumbo core fragments were added to 350 milliliters of test solution in a 16 ounce jar. The jar was sealed and rolled 2 hours at 150° F in a roller oven. The contents of the jar were poured through an 8 inch, 30 mesh screen. The core fragment particles remaining on the screen were recovered, air dried and weighed. The data are given in Table IV below.

TABLE IV

EFFECT OF NaCl ON SHALE STABILIZATION

| Run | Fluid | grams gumbo recovered | % of original |
|---|---|---|---|
| 24 | blank air dried - no fluid | 13.43 | 100 |
| 25 | fresh water | .16 | 1.2 |
| 26 | FW[1] plus 5 pounds of Ca(OH)$_2$ per barrel | 1.52 | 11.6 |
| 27 | sea water | 2.64 | 19.7 |
| 28 | sea water + 5 lbs/bbl calcium hydroxide | 6.33 | 47.1 |
| 29 | FW[1] + 3% (30,000ppm) NaCl | 2.72 | 20.3 |
| 30 | FW[1] + 5% (50,000ppm) NaCl | 3.56 | 26.5 |
| 31 | FW[1] + 10% (100,000ppm) NaCl | 4.56 | 34.0 |
| 32 | FW[1] + 20% (200,000ppm) NaCl | 7.61 | 56.7 |
| 33 | FW[1] + 3% NaCl + 5 lbs/bbl Ca(OH)$_2$ | 5.72 | 42.6 |
| 34 | FW[1] + 5% NaCl + 5 lbs/bbl Ca(OH)$_2$ | 8.30 | 61.8 |
| 35 | FW[1] + 10% NaCl + 5 lbs/bbl Ca(OH)$_2$ | 9.67 | 72.0 |
| 36 | FW[1] + 20% NaCl + 5 lbs/bbl Ca(OH)$_2$ | 9.83 | 73.0 |

[1]FW = fresh water

As can be seen from run 25, the gumbo core fragments disintegrated in fresh water almost completely. Addition of 5 pounds of lime (calcium hydroxide) per barrel resulted in increasing the stabilization from the 1–2% figure obtained using fresh water to 11.6% in run 26. Run 27 shows that sea water resulted in 19.7% protection and run 28 shows that sea water plus 5 pounds of lime per barrel of fluid gave 47.1% protection. Runs 29, 30 and 31 show that salt concentrations of 3%, 5% and 10% gave 20.3, 26.5 and 34% protection respectively.

Runs 33–35 show various concentrations of sodium chloride and lime gave from 42.6 to 73% protection. Clearly these tests show that optimum shale stabilization is achieved only in a fluid having both calcium hydroxide and sodium chloride present. Field performance has substantiated this observation.

TABLE III

| | PV[1] | YP[2] | API w.l.[3] Milliliters |
|---|---|---|---|
| 14. Base fluid[4] | 6 | 13.5 | 200 |
| 15. Base fluid plus 2 lbs/bbl. calcium lignosulfonate dispersant | 6 | 4.5 | 200 |
| 16. Base fluid plus 2 lbs/bbl. calcium lignosulfonate dispersant plus 6 lbs/bbl prehydrolized starch | 14 | 135 | 200 |
| 17. Base fluid plus 4 lbs/bbl. carboxymethylcellulose | 12.0 | 15.5 | 200 |
| 18. Base fluid plus 6 lbs/bbl. chrome lignite | 6.5 | 4.0 | 200 |
| 19. Base fluid plus 4 lbs/bbl. hydroxyethylcellulose (molecular weight = 4000) | 55 | 63 | 10.6 |
| 20. Base fluid plus 4 lbs/bbl. hydroxyethylcellulose (molecular weight 15000) plus 2 lbs/bbl ferrochrome lignosulfonate plus 2 lbs/bbl sodium hydroxide | 30.5 | 5.0 | 14.0 |

[1]PV = plastic viscosity
[2]YP = yield point
[3]API w.l = water loss or filtration rate
[4]A field low solids shale control drilling fluid from the New Mexico State DD well.

FIELD UTILIZATION

A field drilling fluid program based on the information obtained in the above-described laboratory tests was designed for use in the M. L. Baily Gas Unit No. 1 Well which was drilled in the Gomez Field, Pecos County, Texas. The initial 12,000 feet of hole was drilled utilizing a light weight sodium chloride brine fluid containing no other treating materials. Just prior to drilling into the Wolfcamp shale formation, the brine top hole drilling fluid was treated with calcium chloride, and excess calcium hydroxide. The rheological properties were measured and found to be adequate for the hole being drilled. Therefore, neither clay nor asbestos was added to the fluid at that time. Typical drilling fluid properties are contained in Table V, which relate the measurements made on the drilling locations approximately 1 week apart. Only Marsh Funnel viscosity measurements of the drilling fluid were made, and the reported figures are in seconds.

TABLE V

PROPERTIES OF TREATED BRINE

| Run Number | Weight Pounds Per Gallon | Funnel Viscosity, Seconds | $P_f{}^1$ | $Ca^{++}ppm^2$ | $Cl^-ppm^3$ |
|---|---|---|---|---|---|
| 37 | 9.3 | 26.5 | 1.35 | 2600 | 108,000 |
| 38 | 9.6 | 29.2 | 0.75 | 1040 | 129,000 |

[1] $P_f$ = filtrate alkalinity, which is defined as the number of milliliters of .02 N sulfuric acid required to titrate 1 milliliter of drilling fluid filtrate to a phenolphthalein end point.
[2] $Ca^{++}$ppm = filtrate calcium concentration in parts per million.
[3] $Cl^-$ppm = filtrate chloride concentration in parts per million.

The above described treated sodium chloride brine fluid was maintained until hole problem was encountered at a depth of approximately 14,343 feet. At this point it was decided to improve the rheological properties of the fluid by adding asbestos and attapulgite clay. Barium sulfate or Barite was also added to the drilling fluid to increase its density or mud weight to 11.0 pounds per gallon. Typical drilling fluid properties are contained in Table VI, which were taken approximately 1 month apart.

TABLE VI

PROPERTIES OF FIELD [1]PV SOLIDS DRILLING FLUID

| Number | Density Pounds Per Gallon | Funnel Viscosity Seconds | $PV^1$ | $YP^2$ | $PV/YP^3$ | $P_f{}^4$ | $Ca^{++}ppm^5$ |
|---|---|---|---|---|---|---|---|
| 39 | 10.9 | 40 | 6.5 | 41.0 | 0.16 | 0.5 | 1300 |
| 40 | 10.5 | 37 | 7 | 24 | 0.29 | 0.19 | 2000 |

[1] PV = plastic viscosity, calculated by subtracting the 300 r.p.m. Fann VG meter reading from the 600 rpm reading.
[2] YP = yield point, calculated by subtracting the 300 rpm Fann VG meter reading from the plastic viscosity.
[3] PV/YP = ratio of plastic viscosity to yield point, calculated by dividing the plastic viscosity by the yield point.
[4] $P_f$ = filtrate alkalinity, defined as the number of milliliters of .02 N sulfuric acid required to titrate 1 milliliter of drilling fluid filtrate to the phenolphthalein end point.
[5] $Ca^{++}$ppm = filtrate [5]$Ca^+$ concentration in parts per million.

The above described drilling fluid was maintained throughout the remainder of the tests which was completed at a depth of 18,435 feet. Nothing unusual in the way of drilling problem was encountered during the tests. In all of the drilling fluid runs of Tables VI and VII, the filtration rate was periodically measured and determined to be in excess of 200 milliliters, when measured to the standard A.P.I. practice for determining fluid loss. This value is not given in the table and indeed it is difficult to determine the filtration rate accurately when its value is this high. No material was added to the field fluid drilling system in an attempt to control filtration rate, and no problems were encountered which were believed to be a result of utilizing a fluid having such abnormally high filtration rate. A drilling fluid having such a high filtration rate could not be utilized in a geographical area in which a high permeability formation is known to exist, although the above described low solids shale control drilling fluid can be successfully treated with hydroxy-ethylcellulose to reduce its filtration rate if needed.

The field in which the above described well was drilled utilizing the low solid shale control drilling fluid of my invention was an area of considerable drilling activity at the time the test was made. Four other wells were drilled in the immediate area, three utilizing a polysaccharide polymer beneficiated bentonite fresh water drilling fluid, and one utilizing an oil base or water-in-oil emulsion drilling fluid. The drilling material fluid cost and penetration rates or the materials used in wells being drilled through the Wolfcamp shale interval are available, and are tabulated in Table VII immediately below. It can be seen that the polymer beneficiated bentonite drilling fluid used in the drilling of three wells in the immediate vicinity had an average drilling fluid cost in dollars per foot of $5.84, and the invert emulsion or water-in-oil emulsion drilling fluid had a drilling fluid material cost of $8.50 per foot of shale section drilled. It can be seen that the low solid shale control drilling fluid of the subject invention had a material cost of $3.33 per foot of shale section drilled, which compares extremely favorably with the other figures. Similarly, the penetration rate for the polymer beneficiated bentonite fluid was 5.57 feet per hour, and the penetration rate for the water in oil emulsion drilling fluid is 4.77 feet per hour. The use of the low solid shale control drilling fluid of my invention resulted in an average penetration rate through the interval of 6.66 feet per hour. Again this is a very favorable comparison of the four wells drilled in the same area and through the same Wolfcamp shale section.

TABLE VII

AVERAGE DRILLING FLUID COST AND PENETRATION RATE THROUGH INTERVAL DRILLED

| Sample Number | Type of Drilling Fluid | Drilling Fluid Cost, Dollars Per Foot | Penetration Rate Feet Per Hour |
|---|---|---|---|
| 41 | polymer-bentonite | 5.12 | 5.37 |
| 42 | polymer-bentonite | 6.08 | 5.57 |
| 43 | polymer-bentonite | 6.33 | 5.77 |
| 44 | Invert emulsion (water-in-oil) | 8.50 | 4.77 |
| 45 | Low solids shale control drilling fluid | 3.33 | 6.66 |

Thus, I have disclosed and demonstrated in both laboratory experiment and actual field implementation, that the use of a low solid shale control fluid having a soluble calcium filtrate concentration in excess of at least 200 parts per million and preferably in excess of 800 parts per million, a sodium chloride concentration of at least 50,000 parts per million, a filtrate alkalinity of greater than 0.1 and preferably greater than 0.5 milliliters of .02 N sulfuric acid, and containing excess or undissolved calcium hydroxide, and further having a plastic viscosity to yield point ratio less than 1, and having a filtration rate in excess of 100 cc's as measured by the A.P.I. standard fluid loss test procedure, can effectively be used to drill a well into a subterranean heaving shale interval such as the Wolfcamp-Pennsylvanian shale interval with a minimum of difficulty, unusually low drilling fluid material cost per foot of interval drilled, and high penetration rate through the shale interval. While numerous specific illustrative embodiments of my invention have been disclosed in the foregoing specification, many other modifications and variations will be apparent to those skilled in the art of drilling fluid technology which will fall within the true spirit and scope of my invention. It is intended that the invention be restricted and limited only by the restrictions and limitations contained in the claims which are appended hereinafter below.

I claim:

1. An aqueous, low solids drilling fluid comprising:
   a. an aqueous fluid comprising from about 1 to about 10 pounds per barrel calcium hydroxide and from about ¼ to 1 pound per barrel of a calcium salt having a solubility in water greater than calcium hydroxide, said fluid comprising an aqueous phase and a dispersed solid phase;
   b. said aqueous phase having a calcium ion concentration of at least 200 parts per million by weight, said aqueous phase having at least 50,000 parts per million sodium chloride dissolved therein and an alkalinity of at least 0.1 milliliters of 0.02 normal sulfuric acid per milliliter of aqueous phase when titrated to the phenolphthalein end point;
   c. said dispersed solid phase comprising a viscosity increasing material selected from the group consisting of attapulgite, asbestos and a mixture thereof, in a predetermined amount sufficient to cause drilling fluid to have a plastic viscosity of from about 5 to about 20 centipoise at a yield point of from about 5 to about 40 and a ratio of plastic viscosity to yield point of from about 0.25 to about 1.0; and
   d. said fluid having a whole drilling fluid alkalinity of from 10 to 30 milliliters of 0.02 N sulfuric acid per milliliter of whole drilling fluid when titrated to the phenolphthalein end point.

2. The drilling fluid of claim 1 wherein the concentration of the viscosity increasing material is from about 1 to about 10 pounds per barrel of drilling fluid.

3. The drilling fluid of claim 1 wherein the aqueous phase is saturated with sodium chloride.

4. The drilling fluid of claim 1 wherein the dispersed solid phase comprises excess undissolved calcium hydroxide.

5. The drilling fluid of claim 1 wherein the calcium salt having a solubility greater than calcium hydroxide is calcium chloride.

6. The drilling fluid of claim 1 wherein the calcium salt having a solubility greater than calcium hydroxide is calcium nitrate.

7. The drilling fluid of claim 1 wherein the calcium salt having a solubility greater than calcium hydroxide is calcium sulfate.

8. The drilling fluid of claim 1 wherein the calcium salt having a solubility greater than calcium hydroxide is calcium nitrate.

9. The drilling fluid of claim 1 wherein the calcium salt having a solubility greater than calcium hydroxide is calcium acetate.

10. The drilling fluid of claim 1 wherein the calcium salt having a solubility greater than calcium hydroxide is calcium formate.

11. The drilling fluid of claim 1 wherein the drilling fluid has an A.P.I. filtration rate in excess of 100 milliliters.

12. The drilling fluid of claim 1 which also contains from about 1 to about 4 pounds of hydroxyethylcellulose per barrel of drilling fluid.

13. In the drilling of a borehole into the earth, said borehole passing through a subsurface, sloughing shale formation, wherein a drilling fluid is passed through the borehole in contact with the heaving shale formation, the improvement which comprises contacting said sloughing shale formation with an aqueous low solids shale control drilling fluid comprising from 1 to 10 pounds per barrel of calcium hydroxide and from ¼ to 1 pound per barrel of a calcium salt having a solubility in water greater than calcium hydroxide, said drilling fluid having a whole drilling fluid alkalinity of from 10 to 30 milliliters of 0.02 N sulfuric acid per milliliter of drilling fluid when titrated to the phenolphthalein end point, said fluid comprising an aqueous phase having a calcium ion concentration of at least 200 parts per million and being saturated with calcium hydroxide and a sodium chloride concentration of at least 50,000 parts per million, said fluid having dispersed therein a predetermined quantity of a viscosity increasing agent selected from the group consisting of attapulgite clay, asbestos and mixtures thereof sufficient to cause the drilling fluid to have a plastic viscosity of from 5 to 20 centipoise and a yield point of from 5 to 40 and a ratio of plastic viscosity to yield point of from about 0.25 to about 1.0.

14. The method of claim 13 wherein the aqueous phase of the drilling fluid is saturated with respect to sodium chloride.

15. The method of claim 14 wherein the calcium salt having a solubility in water greater than calcium hydroxide is selected from the group consisting of calcium chloride, calcium sulfate, calcium nitrate, calcium acetate and calcium formate.

16. The method of claim 14 wherein the calcium salt is calcium chloride.

* * * * *